United States Patent
Mehat et al.

(10) Patent No.: US 9,619,272 B1
(45) Date of Patent: *Apr. 11, 2017

(54) VIRTUAL MACHINE NETWORKING

(71) Applicant: Google Inc., Mountain View, CA (US)

(72) Inventors: Sanjeet Singh Mehat, Seattle, WA (US); Michael H. Waychison, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,618

(22) Filed: Jan. 4, 2016

Related U.S. Application Data

(63) Continuation of application No. 13/588,874, filed on Aug. 17, 2012, now Pat. No. 9,229,750.

(51) Int. Cl.
G06F 15/16 (2006.01)
G06F 9/455 (2006.01)

(52) U.S. Cl.
CPC ............ *G06F 9/45558* (2013.01); *G06F 2009/45595* (2013.01)

(58) Field of Classification Search
CPC ... H04L 29/12018; H04L 61/10; G06F 9/455; G06F 9/45533
USPC .................................................. 709/203, 250
See application file for complete search history.

(56) References Cited

U.S. PATENT DOCUMENTS

| | | | |
|---|---|---|---|
| 5,854,841 A | 12/1998 | Nakata et al. | |
| 6,366,958 B1 * | 4/2002 | Ainsworth | H04L 29/06 709/230 |
| 6,401,109 B1 | 6/2002 | Heiney et al. | |
| 7,171,492 B1 * | 1/2007 | Borella | H04L 69/16 709/245 |
| 7,424,710 B1 | 9/2008 | Nelson et al. | |
| 7,664,067 B2 | 2/2010 | Pointer | |
| 7,689,987 B2 * | 3/2010 | Neil | G06F 9/4555 703/24 |
| 7,934,020 B1 * | 4/2011 | Xu | G06F 9/485 709/223 |
| 8,291,486 B2 | 10/2012 | Morimoto | |
| 8,539,484 B1 | 9/2013 | Offer et al. | |
| 8,588,179 B2 | 11/2013 | Fujino | |
| 8,589,917 B2 * | 11/2013 | Boss | G06F 9/545 709/201 |
| 8,599,788 B2 | 12/2013 | Song et al. | |

(Continued)

Primary Examiner — Duyen Doan
(74) Attorney, Agent, or Firm — Fish & Richardson P.C.

(57) ABSTRACT

Methods, systems, and apparatus, including computer programs encoded on a computer storage medium, for receiving one or more respective socket commands from a virtual machine socket core, the one or more respective socket commands being associated with a respective socket destination address; determining, based on the one or more respective socket commands and the respective socket destination address, whether to communicate data associated with the one or more respective socket commands to a host virtual socket device; and in response to determining to communicate the data associated with the one or more respective socket commands to the host virtual socket device, converting the socket destination address to a Uniform Resource Identifier (URI) address and communicating the data associated with the one or more respective socket commands and the URI address between the host virtual socket device.

17 Claims, 4 Drawing Sheets

(56) References Cited

U.S. PATENT DOCUMENTS

| | | | | |
|---|---|---|---|---|
| 8,600,726 B1* | 12/2013 | Varshney | ............... | H04L 69/18 |
| | | | | 703/26 |
| 8,630,296 B2* | 1/2014 | Nordmark | ............... | H04L 12/66 |
| | | | | 370/389 |
| 9,229,750 B1* | 1/2016 | Mehat | ............... | G06F 9/455 |
| 2004/0190533 A1* | 9/2004 | Modi | ............... | H04L 29/12367 |
| | | | | 370/400 |
| 2005/0135361 A1 | 6/2005 | Lim et al. | | |
| 2005/0175016 A1* | 8/2005 | Kim | ............... | H04L 69/16 |
| | | | | 370/395.52 |
| 2006/0291502 A1 | 12/2006 | Kalofonos | | |
| 2007/0074192 A1 | 3/2007 | Geisinger | | |
| 2007/0088872 A1 | 4/2007 | Rhee et al. | | |
| 2009/0157896 A1* | 6/2009 | Kim | ............... | H04L 49/90 |
| | | | | 709/232 |
| 2011/0205965 A1 | 8/2011 | Sprigg et al. | | |
| 2012/0269196 A1 | 10/2012 | Jones et al. | | |

* cited by examiner

VIRTUAL MACHINE NETWORKING

CROSS REFERENCE TO RELATED APPLICATIONS

This application is a continuation of and claims priority to U.S. patent application Ser. No. 13/588,874, filed on Aug. 17, 2012, the entire contents of which are hereby incorporated by reference.

BACKGROUND

This specification relates to networking of virtual machines.

Cloud computing is network-based computing in which one or more servers provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines. In a public cloud computing environment, multiple users are able to launch virtual machines (VMs), and each VM launched by a user is included in a cluster of other VMs launched by the user.

BRIEF DESCRIPTION OF THE DRAWINGS

Like reference numbers and designations in the various drawings indicate like elements.

SUMMARY

Figure 1:
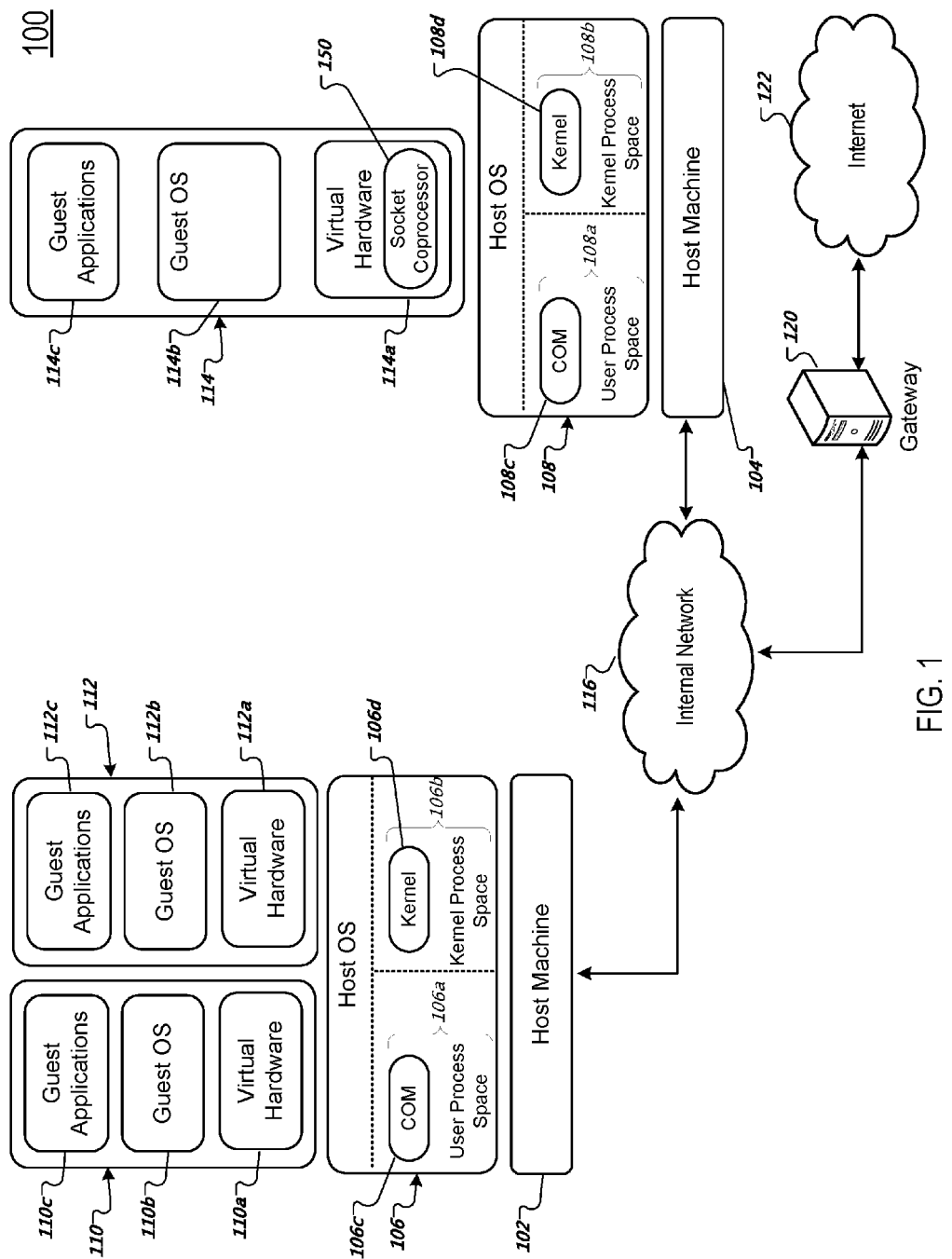
FIG. 1 is a schematic illustration of an example virtual machine system.

In general, one innovative aspect of the subject matter described in this specification can be embodied in methods that include the actions of receiving one or more socket commands from a virtual machine socket core, each of the one or more socket commands being associated with a respective socket destination address; determining, based on the one or more socket commands and the respective socket destination addresses, whether to communicate data associated with the one or more respective socket commands to a host virtual socket device; and in response to determining to communicate the data associated with the one or more respective socket commands to the host virtual socket device, converting the socket destination addresses to a respective Uniform Resource Identifier (URI) address and communicating the data associated with the one or more socket commands and their respective URI addresses between the host virtual socket device.

Other embodiments of this aspect include corresponding systems, apparatus, and computer programs, configured to perform the actions of the methods, encoded on computer storage devices.

These and other embodiments can each optionally include one or more of the following features. The host virtual socket device is implemented using a virtio socket device, wherein the data associated with the one or more respective socket commands is communicated to the virtio socket device using one or more virtio queues. The URI address specifies a protocol, a destination end point address, and a port number. Based on the URI address, the host virtual socket device provides the data associated with the one or more respective socket commands to a socket mapper backend, the socket mapper backend being configured to map, based on the URI address, each of the one or more respective socket commands to a particular socket handler for processing. Each socket handler is configured to communicate the data associated with the respective one or more respective socket commands to the specified destination end point address using the specified protocol. The socket mapper backend is configured to evaluate the URI address based on an access control list. The socket mapper backend is configured to rewrite the URI address based on one or more rules specified in the access control list. The data associated with the one or more respective socket commands are not encapsulated using a networking protocol stack in the virtual machine.

Particular embodiments of the subject matter described in this specification can be implemented so as to realize one or more of the following advantages. Network data can be communicated from a virtual machine, i.e., a guest, to a virtual machine manager, i.e., host, to a host virtual socket device. Network data being communicated from a guest to a host can bypass the networking protocol stack in the virtual machine and is communicated from the guest, using a virtual socket coprocessor device, to the host through a host virtual socket device. Thus, the guest is no longer tasked with the segmentation, fragmentation, dispatching, or re-transmission of data when communicating data between the guest and the host. Data communicated using the host virtual socket device does not rely on timers, e.g., re-transmission timers, as is typically the case in TCP/IP communication.

DETAILED DESCRIPTION

FIG. 1 is a schematic illustration of an example virtual machine system 100. The system 100 includes one or more host machines such as, for example, host machine 102 and host machine 104. Generally speaking, a host machine is one or more data processing apparatuses such as rack mounted servers or other computing devices. The data processing apparatuses can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is or includes an intranet. Host machines can also communicate with devices on one or more external networks 122, such as the Internet. In an embodiment, the host machines may communicate with the one or more external networks 122 through one or more gateways 120 which are data processing apparatuses responsible for routing data communication traffic between the internal network 116 and the external network 122. Other types of external networks are possible.

Each host machine 102, 104 executes a host operating system 106, 108. A host operating system 106, 108 manages host machine resources. In this example, host operating systems 106, 108 run software that virtualizes the underlying host machine hardware and manages concurrent execution of one or more virtual machines. For example, the host operating system 106 manages virtual machine (VM) 110 and VM 112, while a different host operating system 108 manages a single VM 114. VMs can be migrated from one host machine to another host machine. In addition, a single VM can be managed by multiple host machines. Each VM includes a simulated version of the underlying host machine hardware, or a different computer architecture. The simulated version of hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system. Each VM is also allocated virtual disk blocks from one or more virtual disk drives for use by the guest software executing on the VM. The term "virtual disk drive" includes, but is not limited to, a simulated version of a physical disk drive. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example.

In addition to virtual memory and virtual disk resources, VMs can be allocated network addresses through which their respective guest software can communicate with other processes reachable through the internal network 116 or the external network 122. The network addresses can be, for example, Internet Protocol (IP) addresses. In some implementations, each VM is allocated one or more unique Internet Protocol (IP) version 4 or version 6 addresses, one or more User Datagram Protocol (UDP) port numbers, or both. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system, other cluster management software executing on a separate computing device, or both.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. Similarly, the kernel process space 108b is virtual memory reserved for the host operating system 108's kernel 108d.

The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c or communication process 108c). In some implementations, the communication process executes in the user process space (e.g., user process space 106a or user process space 108a) of a host operating system (e.g., host operating system 106 or host operating system 108). In other implementations, the communication process can execute in the kernel process space (e.g., kernel process space 106d or kernel process space 108d) of the host operating system. There can be a single communication process for all VMs executing on a host machine or multiple communication processes, for the VMs executing on a host machine. In yet further implementations, some portion of the communication process executes in the user process space and another portion executes in the kernel process space. For example, the communications process 106c receives packets sent by VM 110 or VM 112 and forwards the packets to the destination identified in the packet.

In various implementations, a VM can be configured so that some or all socket commands from the VM (e.g., socket commands originating from guest software applications) are offloaded to a virtual socket coprocessor device 150 that resides within the VM. The term "socket command" may refer to socket operations that are performed by the user process space component in a guest operating system, e.g., operations performed using the VM's socket core. Some example socket operations include create, connect, bind, release, sendmsg, recvmsg_nosec, splice_read, do_ioctl, poll, mmap, listen, accept, getsockname, getpeername, setsockopt, getsockopt, and shutdown. Other socket operations may also be included.

The virtual socket coprocessor device 150 can be, e.g., a virtual PCI card. In such implementations, data associated with the offloaded socket commands is not encapsulated by a networking protocol stack (e.g., the Open System Interconnection, or OSI, model) in the VM, i.e., the data associated with the socket commands bypasses the VM networking protocol stack. Instead, the data associated with the socket commands is communicated directly to the host using the virtual socket coprocessor device 150. The virtual socket coprocessor device 150 is configured to communicate data associated with the offloaded socket commands to the host operating system that is managing the VM (i.e., the Virtual Machine Manager, or VMM) for further processing. The VMM receives the offloaded socket commands at a host virtual socket device that resides in the host operating system.

In some implementations, both the guest operating system and the host operation system maintain respective states for each socket command being communicated through the virtual socket coprocessor device 150. In such implementations, the guest operating system and the host operating system coordinate their respective states to communicate socket commands asynchronously.

By offloading the socket commands to the virtual socket coprocessor device 150, the VM can communicate data to the host operating system through, e.g., the transport layer, or Layer 4, in the OSI model. Thus, socket commands can be communicated without having to process and communicate the data through a host virtual network (e.g., Ethernet) device, where the data is sent, e.g., through the data link layer, or Layer 2, in the OSI model.

Thus, for example, when an application running in the guest attempts to communicate network data to a device over a network, e.g., the Internet, the create, connect, and bind socket operations that are typically handled by the VM socket core are offloaded to the virtual socket coprocessor device. The virtual socket coprocessor device then communicates data being sent by the guest application to the host operating system through a host virtual socket device. Therefore, the data being sent by the guest application is not processed by the VM networking protocol stack before being sent to the host operating system. Once the data being sent by the guest application is received by the host, the host can process the data using the host networking protocol stack, and can communicate the data to the device over the network.

As a result, the VM is no longer tasked with the responsibility of constructing and communicating data packets to the host operating system, which are then evaluated by the host operating system or some other underlying network fabric. Instead, the host operating system constructs data packets using the data received at the host virtual socket device, and communicates the data packets to a destination end point (e.g., another VM, another machine accessible on the Internet, or an application that is running on the host operating system) that is specified by the VM.

The term "socket" may refer to a bidirectional communication channel between a VM and another end point. In some implementations, a socket is configured as a unidirectional communication channel between a VM and another end point. In other words, a socket can have one direction of communication disabled, e.g., an incoming direction, while the other direction, e.g., an outgoing direction, is enabled. Network communication between the host and guest operating systems can be accomplished by accessing the VM's socket core using, e.g., generally known socket Application Programming Interfaces (APIs) (e.g., the Berkeley sockets API or the Windows Sockets API).

In some implementations, the VM's socket core is configured so that some or all socket-based communication (i.e., socket commands) is offloaded to the virtual socket coprocessor device 150. In some implementations, operations within a socket core are configured to offload socket commands to the virtual socket coprocessor device 150 by including a SOCK_HWASSIST flag in the type of available socket types. For example, when a guest application 114c attempts to create a stream socket, e.g., using the SOCK_STREAM flag, or a datagram socket, e.g., using the SOCK_DGRAM flag, the socket core can be configured to offload the socket to the virtual socket coprocessor device 150 by using a SOCK_HWASSIST flag instead. As a result, socket commands configured using the SOCK_HWASSIST flag are offloaded by the VM to the virtual socket coprocessor device 150 for processing, rather than creating the stream or datagram socket to a destination end point.

In some implementations, the virtual socket coprocessor device 150 has first right of refusal on handling certain global socket functions. For example, the socket core can be configured so that the virtual socket coprocessor device 150 has first right of refusal for handling certain operations, e.g., socket, connect, bind, listen, accept, send, sendto, shutdown, that are made by a guest application 114c. In evaluating its first right of refusal, the virtual socket coprocessor device 150 determines whether socket commands originating from a guest application 114c should be offloaded to the virtual socket coprocessor device 150 for handling.

The VM's virtual hardware also includes a virtual socket device driver that can communicate with a host virtual socket device that resides in the VMM. The virtual socket device driver can be included in the virtual machine's guest software, e.g., as part of the guest operating system. In some implementations, the virtual socket coprocessor device 150 communicates offloaded socket commands to the host virtual socket device in the VMM using the virtual socket device driver. Socket commands being offloaded are tagged with a SOCK_HWASSIST flag, as described above, to indicate that the socket commands should be processed by the virtual socket coprocessor device 150, and not the VM's networking protocol stack. If the virtual socket coprocessor device 150 returns an error code during the offloading of socket commands, the socket commands can be processed using the VM's networking protocol stack. Similarly, in a situation where the virtual socket coprocessor device 150 determines that the socket commands should not be offloaded, the socket commands are processed by the VM's networking protocol stack and passed to the host operating system through the host virtual network (e.g., Ethernet) device.

In some implementations, the host virtual socket device is implemented using a virtio socket device. The virtio socket device can be operated by the VM using a virtio socket device driver. Socket commands can be passed between the VM's virtual socket coprocessor device and the VMM's host virtual socket device using the virtio socket device driver and shared memory, for example, as implemented using one or more virtio queues. In some implementations, socket commands that are received by the VMM's host virtual socket device are evaluated by a socket mapper backend, as described below.

In some implementations, socket destination addresses specified by a guest application 114c are converted by the virtual socket coprocessor device 150 to Uniform Resource Identifier (URI) addresses. This conversion allows the virtual socket coprocessor device 150 to communicate to the host operating system the type of communication protocol (e.g., Transmission Control Protocol, or TCP, or User Datagram Protocol, or UDP), a destination end point address (e.g., Internet Protocol, or IP, address), and a port number. For example, when creating a socket, a guest application 114c can specify a socket destination address that uses the IPv4 protocol (e.g., AF_INET) and is a stream socket (e.g., SOCK_STREAM). In such cases, the virtual socket coprocessor device 150 can convert the socket destination address to a URI address, e.g., having a "tcp://<IPv4 address>:port" format, where "tcp" is the communication protocol, where "IP address" is the end point address, and where "port" is the port number.

An example URI conversion table is:

| Family | Type | URI example conversion |
| --- | --- | --- |
| AF_INET | SOCK_STREAM | tcp://<IPv4 address>:<port> |
| AF_INET | SOCK_DGRAM | udp://<IPv4 address>:<port> |
| AF_INET6 | SOCK_STREAM | tcp6://<IPv6 address>:<port> |
| AF_INET6 | SOCK_DGRAM | udp6://<IPv6 address>:<port> |
| AF_IPX | SOCK_DGRAM | ipx://<IPX address> |

In some implementations, the socket mapper is configured to map incoming socket commands to one or more socket handlers based on their respective URI addresses. For example, the socket mapper can map socket commands associated with a TCP URI address (e.g., "tcp://") to a TCP socket handler. Socket handlers can provide operations for handling a particular protocol. Each socket handler is configured to facilitate communication of socket commands, e.g., by creating sockets, using the protocol specified in a URI address. For example, a UDP socket handler can be configured to process socket commands associated with UDP URI addresses (e.g., "udp://") by converting the socket commands into UDP datagram packets. A TCP socket handler can be configured to process socket commands associated with TCP URI addresses (e.g., "tcp://") by converting the socket commands into TCP packets.

Additional types of socket handlers can be created. For example, a HTTP socket hander can be configured to handle Hypertext Transfer Protocol (HTTP) requests sent by the VM. A DNS socket handler can be configured to respond to Domain Name System (DNS) queries sent by the VM.

In some implementations, the socket mapper backend evaluates the URI addresses provided by the VM based on an access control list (ACL). The host operating system can be configured to perform ACL validation based on regular expression pattern matching of the URI addresses. In some implementations, the host operating system evaluates the URI addresses using a blacklist of regular expressions. In some implementations the host operating system evaluates the URI addresses using a whitelist of regular expressions.

In some implementations, the socket mapper backend is configured implement ACL validation by rewriting URI addresses that were provided by the VM. For example, if the VM provided a URI address for "tcp://foo.bar:80" (i.e., a TCP connection to a site "foo.bar" through port 80), the host operating system can rewrite the URI address to "tcp://foo.bar.secure:1234", (i.e., a secure TCP connection to a different site "foo.bar.secure" through port 1234), so that the URI address is redirected to a secure version of the site "foo.bar" site.

Figure 2:
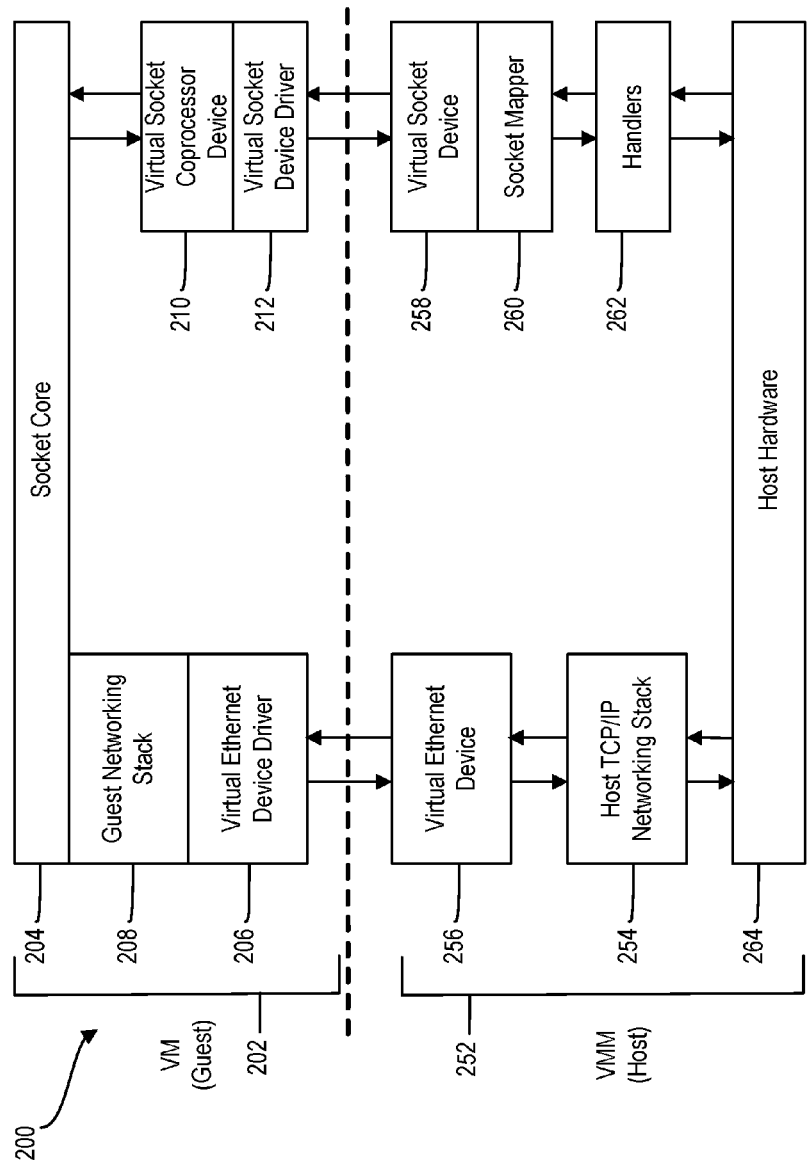
FIG. 2 is a schematic illustration of an example virtual machine system describing network communication between a virtual machine and a virtual machine manager.

FIG. 2 is a schematic illustration of an example virtual machine system 200 describing network communication between a virtual machine (VM), i.e., a guest, 202 and a virtual machine manager (VMM), i.e., a host, 252. Depending on the implementations, a virtual machine system can be configured to perform socket offload using a virtual socket coprocessor device, as described in reference to FIG. 1, or socket offload using a virtual socket coprocessor device in combination with a virtual networking (e.g., Ethernet) device.

The VM 202 includes a socket core 204, a virtual networking device driver 206, a guest networking stack 208, a virtual socket coprocessor device 210, and a virtual socket device driver 212. The VMM 252 includes a host networking stack 254, a virtual networking device 256, a host virtual socket device 258, a socket mapper 260, and handlers 262. The VM 202 can communicate with the VMM by constructing packet data using the guest networking stack 208 and sending the packets to the VMM using the virtual networking device 256.

In some implementations, socket commands from the VM (e.g., socket commands originating from guest software applications) are offloaded to the virtual socket coprocessor device 210, as described above. The virtual socket coprocessor device 210 can convert the socket destination address corresponding to the socket commands to a URI string, as described above. The data associated with offloaded socket commands is communicated to the VMM using the host virtual socket device 258. In some implementations, a socket mapper 260 is configured to map incoming socket commands to one or more socket handlers 262 based on their respective URI addresses, as described above. The socket handlers 262 process and communicate the data to the VMM's hardware 264.

Figure 3:
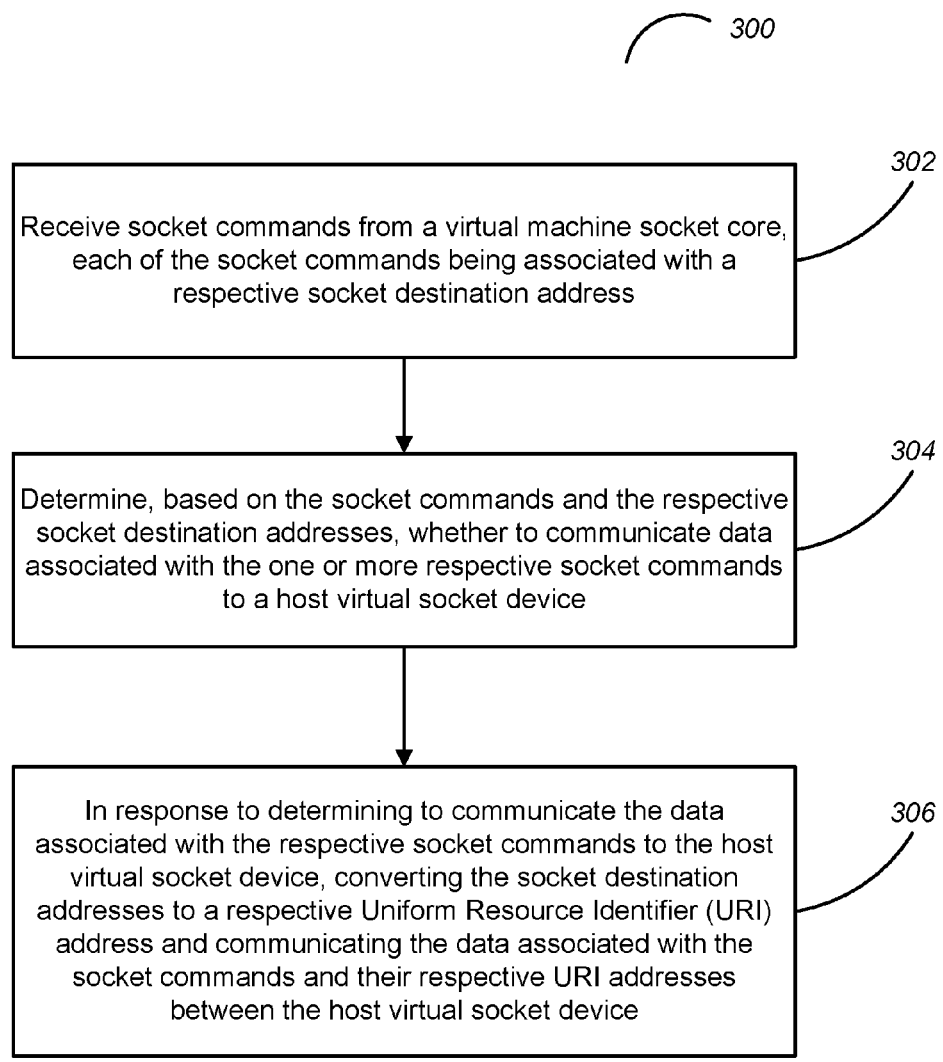
FIG. 3 is a flow diagram illustrating an example technique of offloading socket data to a virtual socket coprocessor device.

FIG. 3 is a flow diagram illustrating an example technique 300 of offloading socket commands to a virtual socket coprocessor device. The technique 300 can be performed by one or more data processing apparatuses. For example, a virtual machine (e.g., virtual machine 114 of FIG. 1) having a virtual socket coprocessor device that is executing on a host machine (e.g., host machine 104 of FIG. 1) can be used to perform the technique 300.

The virtual socket coprocessor device receives 302 socket commands from a virtual machine socket core, each of the socket commands being associated with a respective socket destination address. In some implementations, the virtual machine socket core is configured to offload, e.g., provide, some or all of the socket commands to the virtual socket coprocessor device for processing, as described above.

The virtual socket coprocessor device determines 304, based on the socket commands and the respective socket destination addresses, whether to communicate data associated with the respective socket commands to a host virtual socket device. In some implementations, the virtual socket coprocessor device communicates data associated with the respective socket commands to the host virtual socket device based on a protocol specified in the respective socket destination address. For example, the virtual socket coprocessor device can offload all socket commands associated with a socket address that specifies the TCP protocol. In some implementations, the virtual socket coprocessor device offloads socket commands that include one or more operations specified in a socket core, e.g., socket, connect, bind, listen, accept, send, sendto, or shutdown. In some implementations, socket commands that relate to recv or read, as specified in a socket core, are not offloaded. In such implementations, the virtual machine, i.e., guest, is tasked with processing these socket commands.

In response to determining that data associated with the respective socket commands should be communicated to the host virtual socket device, the virtual socket coprocessor device communicates 306 the data associated with the socket commands to the host virtual socket device using the virtual socket device driver. In some implementations, the virtual socket coprocessor device converts the socket destination address to a URI address, as described above. In some implementations, the host virtual socket device communicates the data associated with the socket commands to a socket mapper backend that resides on the VMM. The socket mapper backend can evaluate URI addresses based on an access control list, as described above.

Figure 4:
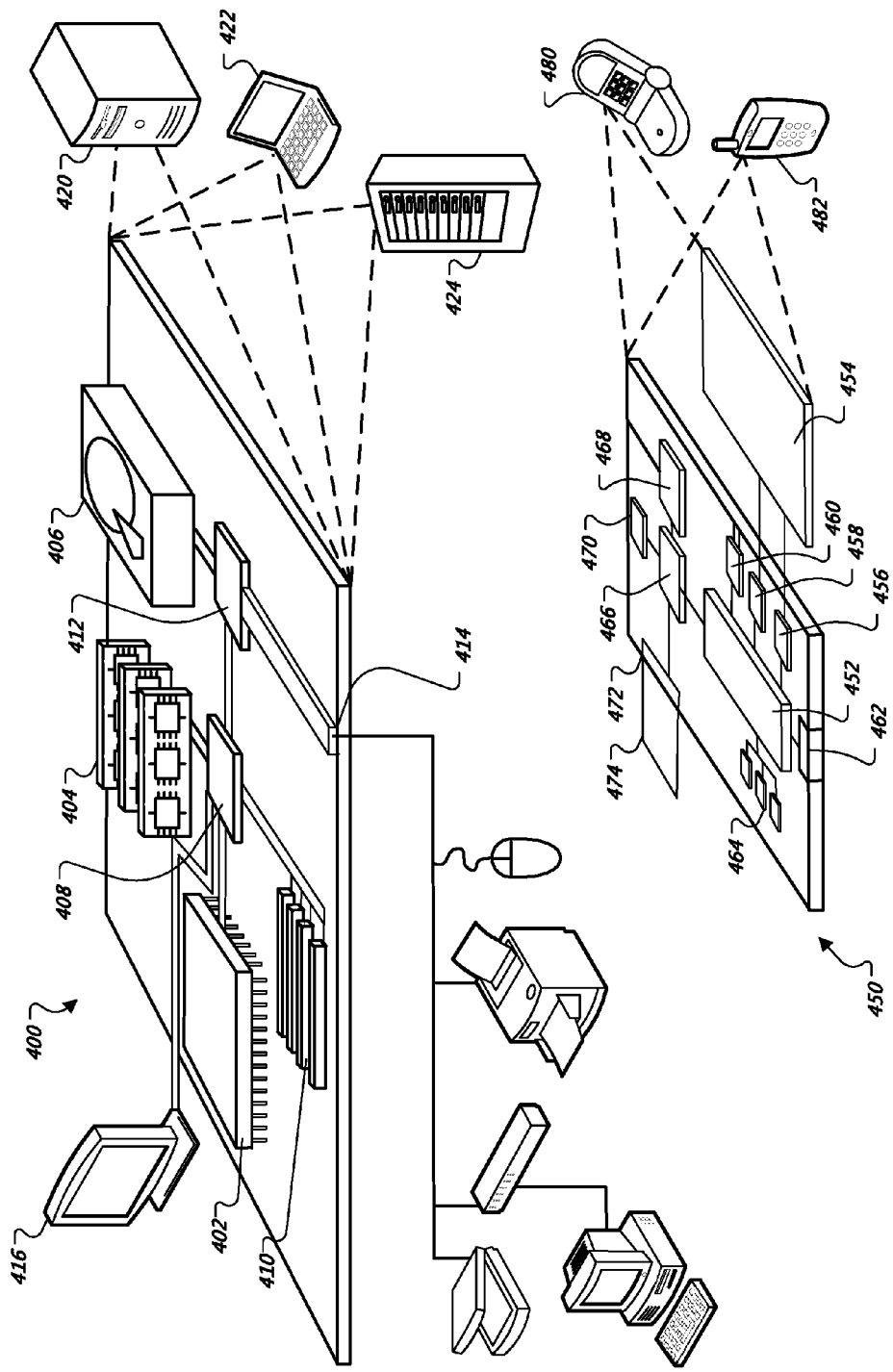
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. The phrase 'computing device' as used herein encompasses its plain and ordinary meaning, including, but not limited to, various forms of digital computers and mobile devices. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 415. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 465 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for virtual machine name resolution may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by one or more computing devices, the method comprising:
   receiving one or more socket commands from a virtual machine socket core associated with a virtual machine running on a host machine, each of the one or more socket commands being associated with a respective socket destination address; and
   communicating the one or more socket commands from the virtual machine to a host virtual socket device residing in a host operating system of the host machine, the communicating including converting the socket destination addresses to a respective Uniform Resource Identifier (URI) address and communicating data associated with the one or more socket commands and their respective URI addresses between the host virtual socket device.

2. The method of claim 1, wherein the host virtual socket device is implemented using a virtio socket device, wherein the data associated with the one or more respective socket commands is communicated to the virtio socket device using one or more virtio queues.

3. The method of claim 1, wherein the URI address specifies a protocol, a destination end point address, and a port number.

4. The method of claim 3, wherein, based on the URI address, the host virtual socket device provides the data associated with the one or more respective socket commands to a socket mapper backend, the socket mapper backend being configured to map, based on the URI address, each of the one or more respective socket commands to a particular socket handler for processing.

5. The method of claim 4, wherein each socket handler is configured to communicate the data associated with the respective one or more respective socket commands to the specified destination end point address using the specified protocol.

6. The method of claim 4, wherein the socket mapper backend is configured to evaluate the URI address based on an access control list.

7. The method of claim 6, wherein the socket mapper backend is configured to rewrite the URI address based on one or more rules specified in the access control list.

8. The method of claim 1, wherein the data associated with the one or more respective socket commands are not encapsulated using a networking protocol stack in the virtual machine.

9. A system comprising:
   a non-transitory storage medium encoded with instructions; and
   a virtual socket coprocessor device configured to execute the instructions to perform operations comprising:
      receiving one or more socket commands from a virtual machine socket core associated with a virtual machine, each of the one or more socket commands being associated with a respective socket destination address; and
      communicating the one or more socket commands from the virtual machine to a host virtual socket device residing in a host operating system of the host machine, the communicating including converting the socket destination addresses to a respective Uniform Resource Identifier (URI) address and communicating data associated with the one or more socket commands and their respective URI addresses between the host virtual socket device.

10. The system of claim 9, wherein the host virtual socket device is implemented using a virtio socket device, wherein the data associated with the one or more respective socket commands is communicated to the virtio socket device using one or more virtio queues.

11. The system of claim 9, wherein the URI address specifies a protocol, a destination end point address, and a port number.

12. The system of claim 11, wherein, based on the URI address, the host virtual socket device provides the data associated with the one or more respective socket commands to a socket mapper backend, the socket mapper backend being configured to map, based on the URI address, each of the one or more respective socket commands to a particular socket handler for processing.

13. The system of claim 12, wherein each socket handler is configured to communicate the data associated with the respective one or more respective socket commands to the specified destination end point address using the specified protocol.

14. The system of claim 12, wherein the socket mapper backend is configured to evaluate the URI address based on an access control list.

15. The system of claim 14, wherein the socket mapper backend is configured to rewrite the URI address based on one or more rules specified in the access control list.

16. The system of claim 9, wherein the data associated with the one or more respective socket commands are not encapsulated using a networking protocol stack in the virtual machine.

17. A non-transitory computer storage medium encoded with a computer program comprising instructions that when executed by data processing apparatus cause the data processing apparatus to perform operations comprising:
   receiving one or more socket commands from a virtual machine socket core associated with a virtual machine, each of the one or more socket commands being associated with a respective socket destination address; and
   communicating the one or more socket commands from the virtual machine to a host virtual socket device residing in a host operating system of the host machine, the communicating including converting the socket destination addresses to a respective Uniform Resource Identifier (URI) address and communicating data associated with the one or more socket commands and their respective URI addresses between the host virtual socket device.

* * * * *